US011249775B2

(12) United States Patent
Yan et al.

(10) Patent No.: US 11,249,775 B2
(45) Date of Patent: Feb. 15, 2022

(54) SOFTWARE INTERNATIONALIZATION AND LOCALIZATION PROTOCOL IN A COMPUTING SYSTEM

(71) Applicant: VMware, Inc., Palo Alto, CA (US)

(72) Inventors: Demin Yan, Campbell, CA (US); RongGuang Lin, Beijing (CN); Zohar Hirshfeld, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/452,071

(22) Filed: Mar. 7, 2017

(65) Prior Publication Data

US 2018/0260232 A1    Sep. 13, 2018

(51) Int. Cl.
*G06F 9/451* (2018.01)

(52) U.S. Cl.
CPC .................................. *G06F 9/454* (2018.02)

(58) Field of Classification Search
CPC ............................. G06F 9/454; G06F 9/4448
USPC ....................................................... 715/234
See application file for complete search history.

(56) References Cited

U.S. PATENT DOCUMENTS

| | | | | |
|---|---|---|---|---|
| 2003/0115186 A1* | 6/2003 | Wilkinson | .......... | G06F 16/9574 |
| 2007/0136470 A1* | 6/2007 | Chikkareddy | .......... | G06F 9/454 |
| | | | | 709/226 |
| 2012/0084643 A1* | 4/2012 | Govindan | .............. | G06F 40/151 |
| | | | | 715/255 |
| 2012/0109998 A1* | 5/2012 | Patch | ....................... | G06F 9/454 |
| | | | | 707/769 |
| 2013/0054736 A1* | 2/2013 | Hunt | .................... | G06F 9/45533 |
| | | | | 709/217 |
| 2014/0280704 A1* | 9/2014 | Ongg | ....................... | H04L 67/10 |
| | | | | 709/217 |
| 2014/0372098 A1* | 12/2014 | Arseniev | ................. | G06F 9/454 |
| | | | | 704/2 |
| 2015/0154182 A1* | 6/2015 | Chandrasekharan | ........................ | |
| | | | | G06F 17/289 |
| | | | | 715/234 |
| 2015/0161112 A1* | 6/2015 | Galvez | ..................... | G06F 9/454 |
| | | | | 704/7 |
| 2015/0277939 A1* | 10/2015 | Johnson | .............. | G06F 9/44505 |
| | | | | 717/121 |

OTHER PUBLICATIONS

Fielding, Roy Thomas, Architectural Styles and the Design of Network-based Software Architectures, 2000, Chapter 5, pp. 76-101 (Year: 2000).*

* cited by examiner

*Primary Examiner* — Keith D Bloomquist
(74) *Attorney, Agent, or Firm* — Patterson + Sheridan, LLP (57) ABSTRACT

An example method of implementing internationalization and localization for a software application includes: receiving, at a service, a first request from the software application for a localized resource corresponding to a target locale, the localized resource including a string or a format; sending a second request from the service to a backend server for the localized resource; receiving the localized resource from the backend server in response to the second request; and returning the localized resource from the service to the software application.

16 Claims, 7 Drawing Sheets

SOFTWARE INTERNATIONALIZATION AND LOCALIZATION PROTOCOL IN A COMPUTING SYSTEM

BACKGROUND

In today's fast-paced world, the goal of software internationalization and localization is to deliver a consistent product and user experience to users throughout the world with efficiency and agility. Internationalization includes the design and development of a software product that enables localization for target users that vary in culture, region, and/or language. Internationalization is often abbreviated as "i18n." Localization includes the adaptation of a software product to meet the language, cultural, and/or other requirements of a specific target market (a "locale"). Localization is often abbreviated as "l10n."

Today, software developers rely on the libraries provided by the underlying programming languages, frameworks, and operating systems (OS'es) to internationalize and localize a software product. Due to different implementations of such libraries, however, the software product, which is often developed using more than one programming language, will exhibit different behaviors in the user interface (UI). For example, the libraries of different programming languages can present date and time in different formats for the various locales, can exhibit different locale fallback mechanisms, and the like. Since the libraries are part of the programming languages and frameworks, the libraries are tied to each individual software product. As a result, software developers experience difficultly in implementing efficient and consistent localization when updating the software product over time.

SUMMARY

Techniques for providing a internationalization and localization protocol in a computer system are described. In an embodiment, a method of implementing internationalization and localization for a software application includes: receiving, at a service, a first request from the software application for a localized resource corresponding to a target locale, the localized resource including a string or a format; sending a second request from the service to a backend server for the localized resource; receiving the localized resource from the backend server in response to the second request; and returning the localized resource from the service to the software application.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Techniques for providing an internationalization and localization protocol (ILP) are described. As discussed above, in a conventional implementation of internationalization and localization, applications are tied to l10n and i18n libraries. This results in different behaviors across applications developed using different programming languages and frameworks. Further, bundling specific libraries and localized resources with the applications can make it difficult to update the localized resources in between product cycles. Further, in the conventional process of localizing an application, there are many manual steps involved between product developers and translators. This is error-prone and leads to product release blockers, such as missing translations for a certain portion of the application due to lack of communication between developers and translators. Accordingly, embodiments described herein decouple the internationalization and localization layer from the applications into an independent service or micro-service. Various embodiments are described further below with respect to drawings.

Figure 1:
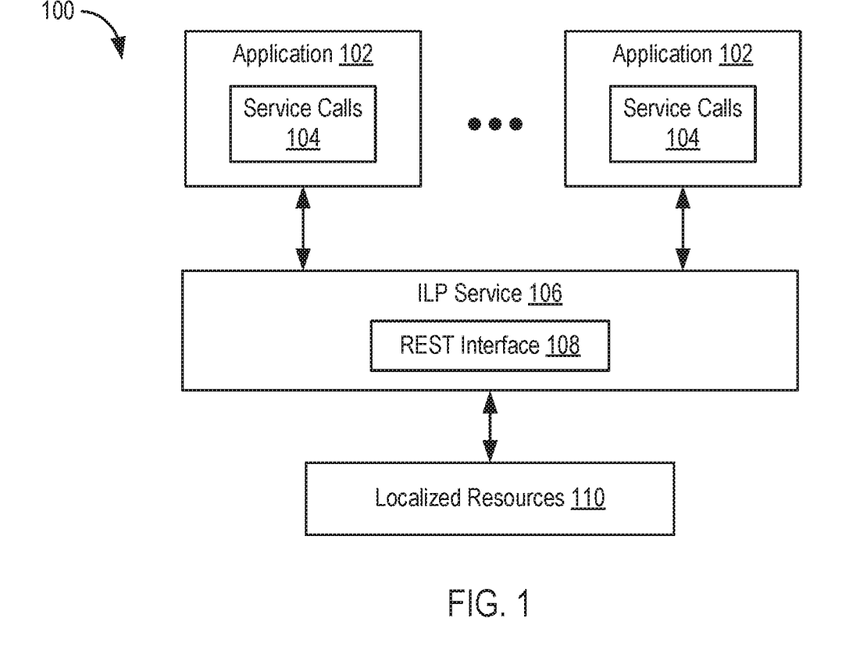
FIG. 1 is a block diagram depicting an internationalization and localization protocol (ILP) framework according to an embodiment.

FIG. 1 is a block diagram depicting an internationalization and localization protocol (ILP) framework 100 according to an embodiment. ILP framework 100 includes one or more applications 102, ILP service 106, and localized resources 110. Each application 102 requires one or more localized resources 110. "Localized resources" include strings, as well as formats (e.g., date formats, time formats, calendar formats, currency formats, etc.), targeted to a particular locale. Each application 102 obtains localized resources 110 via communication with ILP service 106. Each application 102 is configured to obtain localized resources 110 using service calls 104 to ILP service 106. In an embodiment, ILP service 106 includes a representational state transfer (REST) application programming interface (API) ("REST API 108") for use by applications 102 in obtaining localized resources 110. Localized resources 110 can include a set of localized resources for each application 102. ILP service 106 returns localized resources 110 to applications 102 upon request.

Notably, applications 102 do not require any special purpose library for internationalization and localization (e.g., l10n and i18n libraries). Applications 102 can be developed using various programming languages. ILP service 106 is agnostic to the programming language used to develop each application 102. Internationalization and localization is decoupled from applications 102 into an independent service or micro-service (i.e., ILP service 106). In this manner, implementation of localization and internationalization support for applications 102 is independent from any programming languages or frameworks upon which they are based. This also allows for resources to be translated into sets of localized resources on the fly at any time without updating applications 102.

Figure 2:
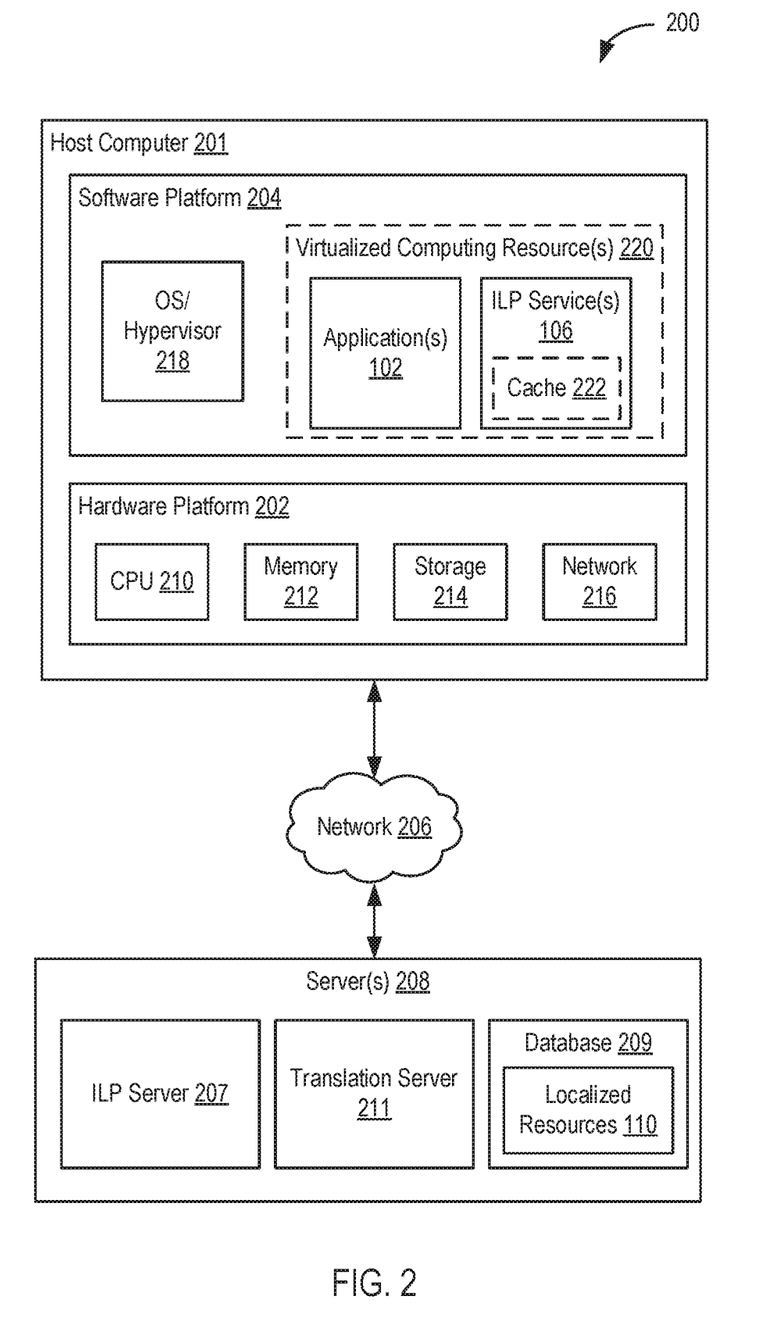
FIG. 2 is a block diagram depicting a computing system according to an embodiment.

FIG. 2 is a block diagram depicting a computing system 200 according to an embodiment. Computing system 200 includes a host computer 201 having a software platform 204 executing on a hardware platform 202. Hardware platform 202 may include conventional components of a computing device, such as a central processing unit (CPU) 210 and system memory 212, as well as a storage system ("storage 214"), network devices ("network 216"), and the like (not shown). CPU 210 is configured to execute instructions, for example, executable instructions that perform one or more operations described herein and may be stored in system memory 212 and storage 214. System memory 212 is a device allowing information, such as executable instructions, virtual disks, configurations, and other data, to be stored and retrieved. System memory 212 may include, for example, one or more random access memory (RAM) modules.

Software platform 204 includes an operating system (OS) or hypervisor ("OS/hypervisor 218"), application(s) 102, and ILP service(s) 106. In an embodiment, application(s) 102 and ILP service(s) 106 directly execute on hardware platform 202 within the context of an OS. The OS can be any commodity operating system known in the art, such as Linux®, Microsoft Windows®, Mac OS®, or the like. In another embodiment, application(s) 102 and ILP service(s) 106 execute on hardware platform 202 within the context of a virtualized computing resource 220 managed by a hypervisor. A hypervisor is a virtualization layer that abstracts processor, memory, storage, and networking resources of hardware platform 202 into one or more virtualized computing resources 220 (e.g., virtual machines, containers, or the like) that run concurrently on host computer 201. Virtualized computing resources 220 run on top of the virtualization layer, referred to herein as a hypervisor, which enables sharing of the hardware resources. One example of a hypervisor that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein).

Host computer 201 is coupled to one or more server computers ("server(s) 208") through a network 206 (e.g., a local area network (LAN), wide area network (WAN), the public Internet, etc., or a combination thereof). Server(s) 208 are computing devices similar to host computer 201 described above and thus the internal details of server(s) 208 are omitted for clarity. Server(s) 208 execute software, including ILP server 207 and translation server 211. ILP server 207 and translation server 211 can be implemented using separate server computers or can be implemented on the same server computer. ILP server 207 is configured to communicate with ILP services 106. An ILP service 106 can register with ILP server 207 to request and receive localized resources. ILP server 207 communicates with translation server 211 to obtain localized resources on behalf of ILP services 106. Translation server 211 manages a database 209 of localized resources 110. Translation server 211 queries database 209 in response to requests for localized resources. Translation server 211 returns the requested localized resources or notifies ILP server 207 that the requested localized resources are unavailable (e.g., not present in database 209). In case requested localized resources are unavailable, translation server 211 can generate external requests for such localized resources to be created. For example, translation server 211 can send notifications to translation teams requesting that particular localized resources be created and added to database 209. In some embodiments, the functions of the ILP server 207 and the translation server 211 can be combined into a single server application.

In an embodiment, ILP service 106 can maintain a cache 222 of localized resources on behalf of application(s) 102. Thus, once localized resources have been obtained from ILP server 207, there is no need to send additional requests to ILP server 207 for the same localized resources. Rather, when application(s) 102 request cached localized resources, ILP service 106 can return the requested localized resources from cache 222. In an application 102 is updated to a new version, ILP service 106 can invalidate cached localized resources for the updated application. Thus, requests from an updated application 102 are forwarded to ILP server 207 to obtain possibly updated localized resources. While a centralized cache 222 is shown in ILP service 106, in other embodiments, each application 102 can maintain its own cache of localized resources.

In an embodiment, ILP server 207 can push updated localized resources to ILP services 106. A user can interact with translation server 211 to update localized resources 110 in database 209 (e.g., add new localized resources and/or modify existing localized resources). Translation server 211 notifies ILP server 207 of the updated localized resources 110. ILP server 207 determines which ILP services 106 subscribed to ILP server 207 service application(s) 102 that require the updated localized resources. ILP server 207 pushes the updated localized resources to corresponding ILP services 106. Each ILP service 106 then updates cache 222 or otherwise provides the updated localized resources to application(s) 102.

Figure 3:
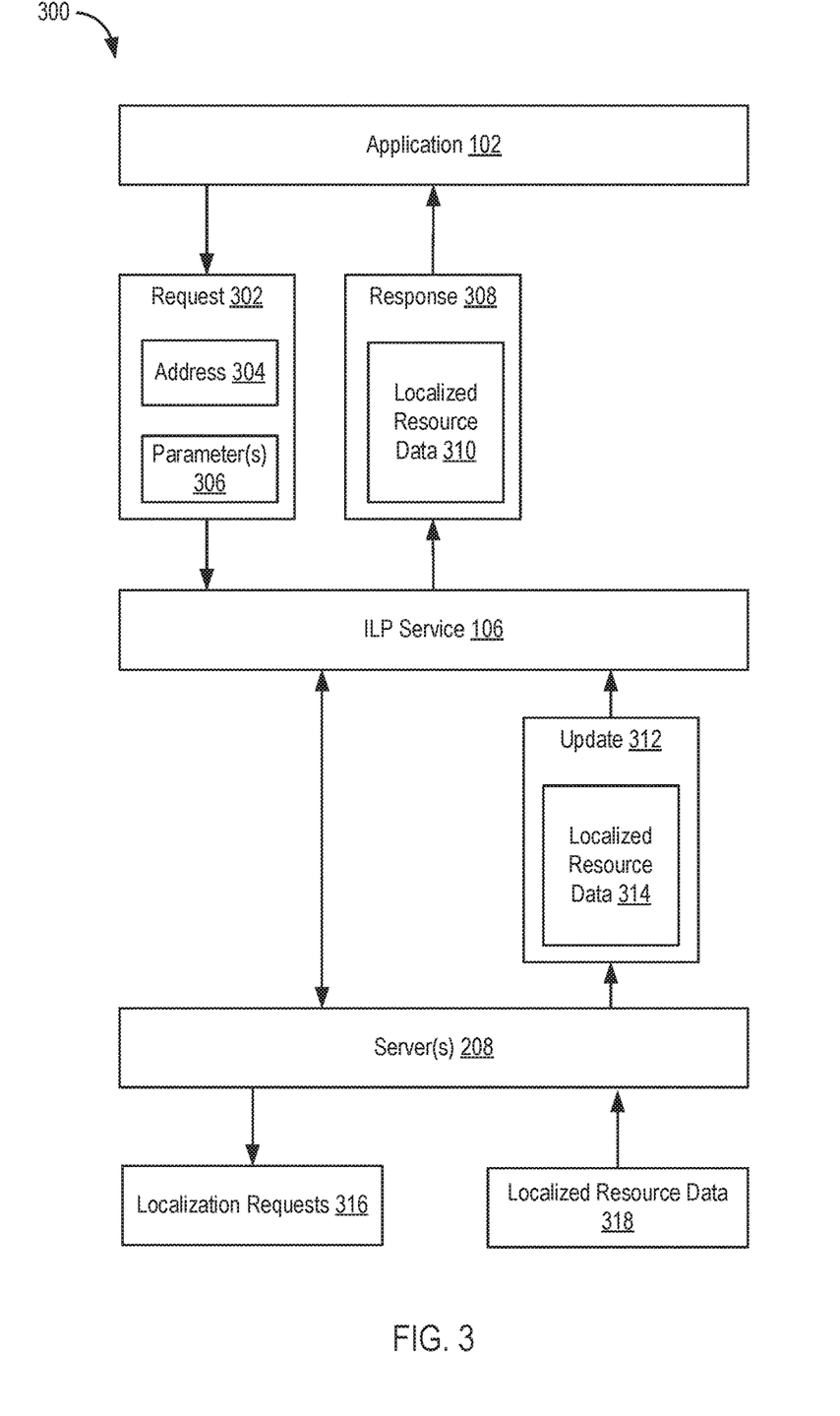
FIG. 3 is a block diagram illustrating an ILP protocol according to an example.

FIG. 3 is a block diagram illustrating an ILP protocol 300 according to an example. ILP protocol 300 includes communications between application 102 and ILP service 106 and communications between ILP service 106 and server(s) 208. Application 102 generates a request 302 for a localized resource. In general, request 302 includes an address 304 associated with ILP service 106 and parameters 306 defining the request. In embodiment, request 302 can be a hypertext transfer protocol (HTTP) method invoked using a particular uniform resource locator (URL). Parameters 306 can be included as options in the URL and/or as data enclosed in the method (e.g., data for a POST method). Parameters 306 include identification information for application 102 (e.g., name, version, globally unique identifier (GUID), etc.), as well as information relating to a request for localized resource(s).

For example, application 102 can issue a request for the date format in a particular locale as follows: https://<ILP service address>/i18n/api/v1/date/localizedDate?locale=<locale>&longDate=<longDate>&pattern=<pattern>. In this example, application 102 sends a request using version 1 of the i18n API of ILP service 106. The URL targets the localized date and includes parameters for the locale, the type of date format requested (e.g., long date), and the particular date pattern requested. This is merely one example and request 302 can include various other formats.

ILP service 106 returns a response 308 to application 102 having localized resource data 310. Localized resource data 310 includes a requested localized resource or an indication that the requested localized resource is not available. In an embodiment, localized resource data 310 is included in the message body of a response to the particular HTTP method used to issue the request. Localized resource data 310 can be conveyed in various formats, such as extensible markup language (XML), JavaScript Object Notation (JSON), or the like. For example, ILP service 106 can return the following in response to a request from application 102 for the date format in the example above:

Response from ILP Service:

```
{
    "formattedDate": "string"
    "locale": "string"
    "longDate": "string"
    "pattern": "string"
}
``` where "string" is populated with the specific information related to the target locale. While the examples above are described with respect to an HTTP request/response protocol, those skilled in the art will appreciate that other types of request/response protocols can be employed between application 102 and ILP service 106.

ILP service 106 can implement various failure mechanisms in case a localized resource is not available. In an embodiment, if a localized resource for a target locale is not available, ILP service 106 can instead return a localized resource for a default locale. Alternatively, ILP service 106 can simply notify application 102 that the localized resource for the target locale is not available, relying instead on application 102 perform the substitution. In yet another embodiment, ILP service 106 can return a substituted localized resource for an unavailable localized resource along with a notification of the substitution. Application 102 can then accept the substituted localized resource or perform some other appropriate action.

For each request 302, ILP service 106 can service the request from a cache (e.g., cache 222). If the requested localized resource is not in the cache or no cache is used, ILP service 106 sends a request for the localized resource to server(s) 208. Server(s) 208 implement the functionality of ILP server 207 and translation server 211. In particular, server(s) 208 return available localized resources to ILP service 106 upon request. Server(s) 208 can return substitute localized resources and/or notifications of unavailability for those localized resources that are unavailable. A user can provide localized resource data 318 to server(s) 208 at any time. For example, a user can initially provide a set localized resource data 318 for a given application 102, and can provided additional localized resource data 318 for application 102 over time. The additional localized resource data 318 can be updates to existing localized resource data or can be entirely new. Server(s) 208 also generate localization requests 316 in response to unavailable localized resources. Server(s) 208 can send localization requests 316 to a translation team for generation of the missing localized resources.

Server(s) 208 provided updated localized resources to ILP service 106. In an embodiment, server(s) 208 can push updated localized resources to ILP service 106. Alternatively, ILP service 106 can periodically poll server(s) 208 for updated localized resources. In either case, server(s) 208 provide an update 312 having localized resource data 314 to ILP service 106. Localized resource data 314 includes updated localized resource(s) used by application 102. ILP service 106 can store the updated localized resources in its cache. If application 102 maintains its own cache, ILP service 106 can provide updated localized resources to application 102 for storage in its cache.

Figure 4:
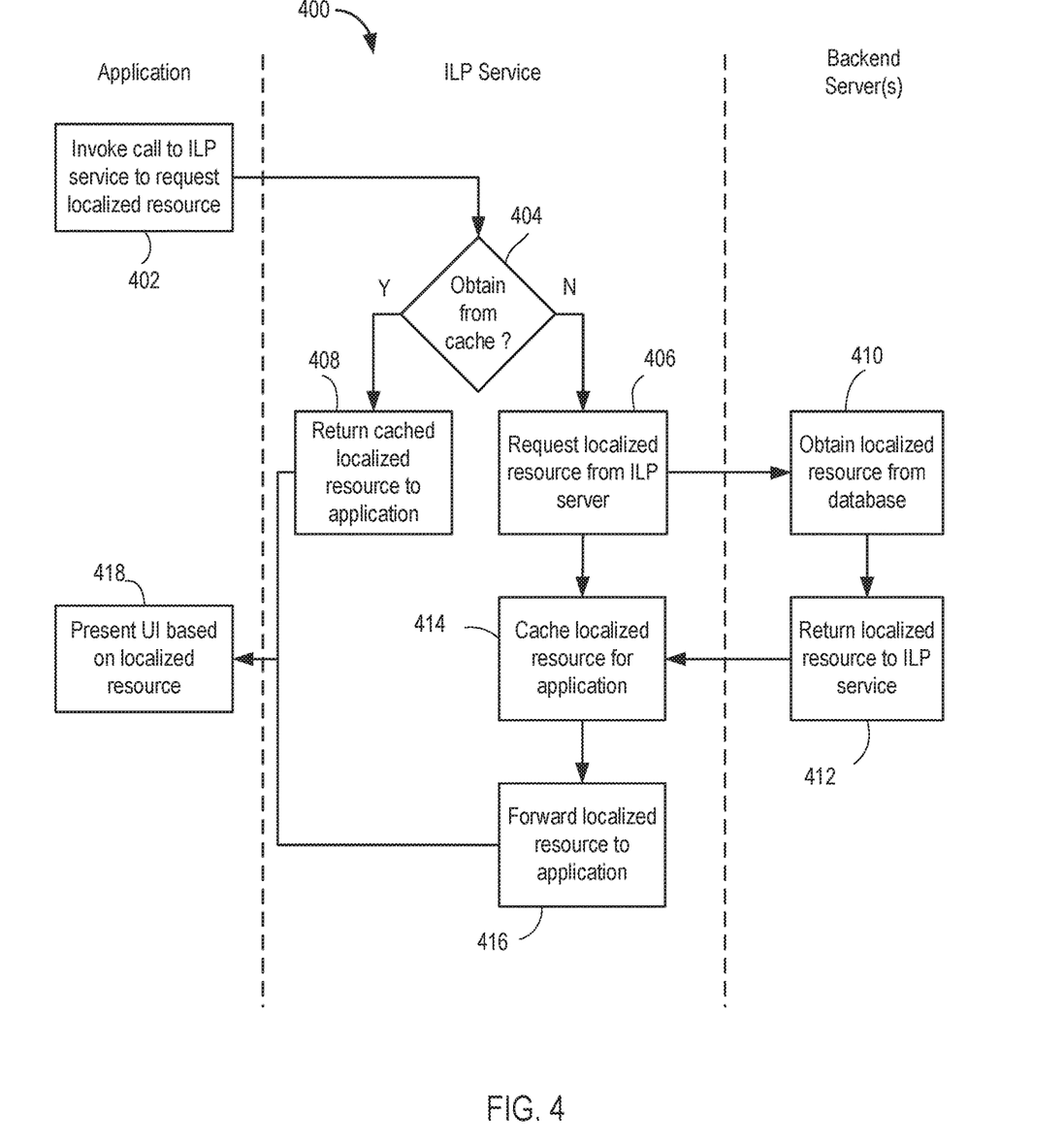
FIG. 4 is a flow diagram depicting a method of implementing internationalization and localization for an application according to an embodiment.

FIG. 4 is a flow diagram depicting a method 400 of implementing internationalization and localization for an application according to an embodiment. Method 400 includes steps performed by the application, the ILP service, and backend server(s) (e.g., ILP server 207 and/or translation server 211). At step 402, application 102 invokes a call to ILP service 106 to request a localized resource. At step 404, ILP service 106 determines whether the requested localized resource can be obtained from a cache. If no cache exists or the requested localized resource cannot be obtained from the cache, method 400 proceeds to step 406. Otherwise, method 400 proceeds to step 408, where ILP service 106 returns the cached localized resource to application 102. If ILP service 106 determines that application 102 has been updated to a new version (based on information in the request), ILP service 106 can proceed to step 406 even if the requested localized resource is in the cache.

At step 406, ILP service 106 requests the localized resource from a backend server (e.g., ILP server 207). At step 410, the backend server obtains the localized resource from a database. At step 412, the backend server returns the localized resource to ILP service 106. Further details of the process performed by the backend server(s) is discussed below, including steps pertaining to unavailable localized resources.

At step 414, ILP service 106 caches the localized resource obtained from the backend server(s). At step 416, ILP service 106 forwards the localized resource to application 102. At step 418, application 102 presents the localized resource in a user interface (UI) or otherwise makes use of the localized resource.

Method 400 is applicable when the requested localize resource is available and is either cached in ILP service 106 or capable of being cached in ILP service 106. If ILP service 106 does not include a cache, ILP service 106 can perform only steps 406 and 416 of method 400 for forwarding the request to the backend server(s) and returning the requested localized resource to application 102. Techniques described below can be employed when the requested localized resource is unavailable.

Figure 5:
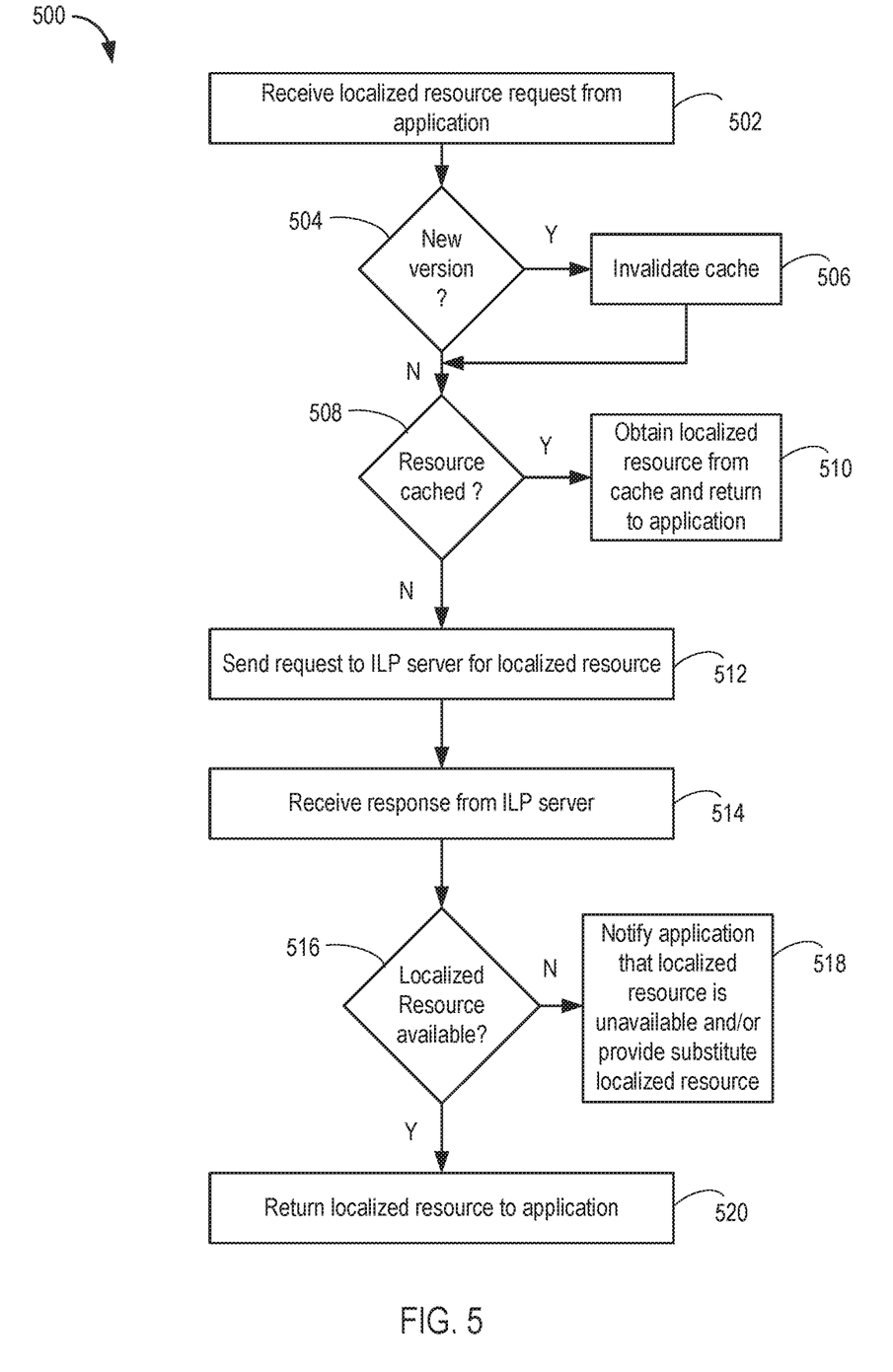
FIG. 5 illustrates a method of processing a request for a localized resource at an ILP service according to an embodiment.

FIG. 5 illustrates a method 500 of processing a request for a localized resource at ILP service 106 according to an embodiment. Method 500 begins at step 502, where ILP service 106 receives a request for a localized resource from application 102. At step 504, ILP service 106 determines if application 102 has been updated to a new version. If so, method 500 proceeds to step 506, where ILP service 106 invalidates cached localized resources used by application 102. Method 500 then proceeds to step 508. If application 102 has not been updated to a new version, method 500 proceeds to step 508.

At step 508, ILP service 106 determines whether the localized resource has been cached. If so, method 500 proceeds to step 510, where ILP service 106 obtains the localized resource from the cache and returns the localized resource to application 102. If the requested localized resource is not cached, method 500 proceeds from step 508 to step 512.

At step 512, ILP service 106 sends a request to ILP server 207 for the localized resource. At step 514, ILP service 106 receives a response from ILP server 207. At step 516, ILP service 106 determines whether the localized resource is available. For example, ILP server 207 can indicate the availability status for the localized resource in the response. If the localized resource is not available, at step 518, ILP server 207 can notify application 102 that the requested localized resource is unavailable and/or provide a substitute localized resource. ILP service 106 can obtain a substitute localized resource from the response sent by the ILP server 207.

If the localized resource is available at step 516, method 500 proceeds to step 520. At step 520, ILP service 106 returns the localized resource to application 102.

Figure 6:
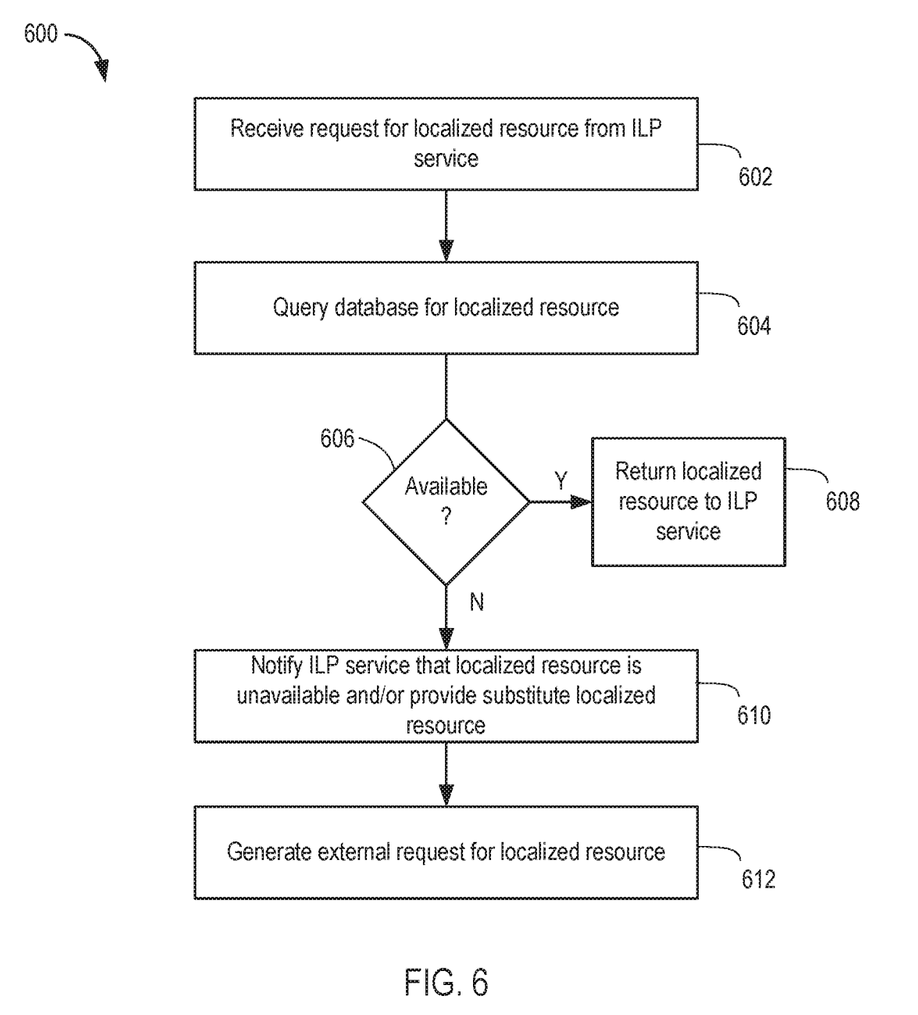
FIG. 6 is a flow diagram depicting a method of processing a request for a localized resource at backend server(s) according to an embodiment.

FIG. 6 is a flow diagram depicting a method 600 of processing a request for a localized resource at backend server(s) according to an embodiment. Backend server(s) can be implemented using ILP server 207 and translation server 211, discussed above, or some other combination of servers. Method 600 begins at step 602, where a backend server receives a request for a localized resource from ILP service 106. At step 604, the backend server queries a database for the localized resource. At step 606, the backend server determines whether the localized resource is available in the database. If so, method 600 proceeds to step 608, where the backend server returns the localized resource to the ILP service 106. If the localized resource is not available in the database, method 600 proceeds to step 610.

At step 610, the backend server notifies ILP service 106 that the requested localized resource is not available and/or provides a substitute localized resource. At step 612, the backend server generates an external request for the localized resource. The external request can be sent to a translation team or the like to request generation of the localized resource.

Figure 7:
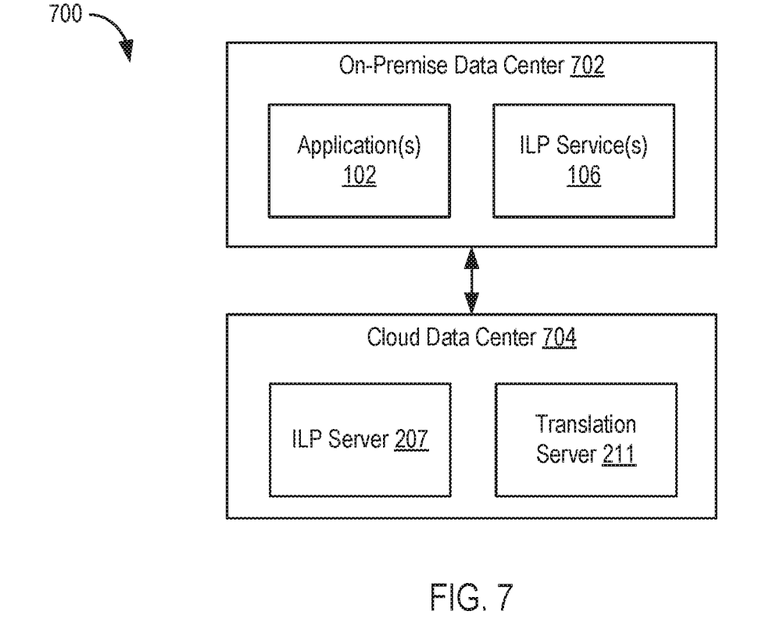
FIG. 7 is a block diagram depicting a computing system in which the internationalization and localization framework discussed herein can be employed.

FIG. 7 is a block diagram depicting a computing system 700 in which the internationalization and localization protocol framework discussed above can be employed. Computing system 700 includes an on-premise data center 702 and a cloud data center 704. On-premise data center 702 executes application(s) 102 and ILP service(s) 106. Cloud data center 704 executes ILP server 207 and translation server 211 (or any other configuration of the backend servers). In this use model, users execute application(s) 102 on local resources and localized resource requests are serviced using cloud resources.

Figure 8:
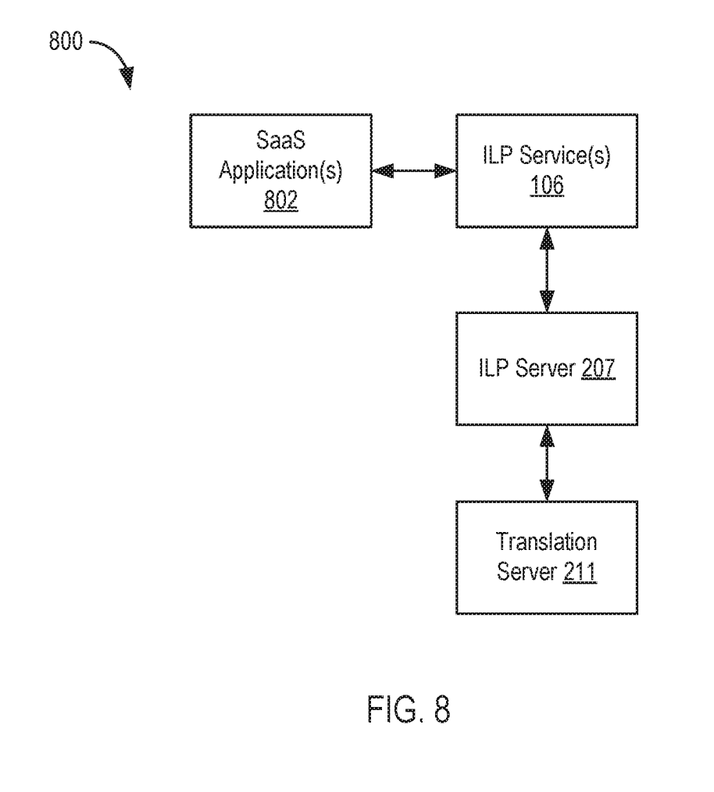
FIG. 8 is a block diagram depicting another computing system in which the internationalization and localization framework discussed herein can be employed.

FIG. 8 is a block diagram depicting another computing system 800 in which the internationalization and localization protocol framework can be employed. In the present embodiment, application(s) 102 comprise software-as-a-service (SaaS) application(s) 802 that execute in a cloud computing system. SaaS application(s) 802 communicate with ILP service(s) 106 identically as described above for application(s) 102. Likewise, ILP service(s) 106 communicate with ILP server 207, which in turn communicates with translation server 211, as described above. The components in FIG. 8 can be deployed in one or more cloud computing systems.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of implementing internationalization and localization for a plurality of software applications executing independent of each other in one or more host computers, the method comprising:
   receiving, at a service that is executing independent of any software and framework associated with any of the plurality of software applications from which any request is received and that is executing in a host computer, a request from a software application of the plurality of software applications for a localized resource corresponding to a target locale, the service including a representational state transfer (REST) application programming interface (API) configured for communicating requests for localized resources received from the plurality of software applications to a backend server;
   determining, by the service based on a version identified in the request, whether the software application has been updated from a first version to a second version;
   if the software application has been updated to the second version:
      invalidating, by the service, a cached localized resource, wherein the cached localized resource corresponds to the first version of the software application;
      forwarding, by the service via the REST API, the request from the software application for the localized resource corresponding to the target locale to the backend server;
      in response to forwarding the request, receiving an updated localized resource from the backend server; and
      caching, by the service, the updated localized resource at a cache maintained by the service;
   if the software application has not been updated to the second version, obtaining, by the service, the cached localized resource; and
   returning the localized resource or the updated localized resource from the service to the software application.

2. The method of claim 1, further comprising:
   receiving, at the service, a second request from the software application for another localized resource corresponding to the target locale;
   determining, by the service, whether the other localized resource is stored in the cache maintained by the service;
   if the other localized resource is stored in the cache, obtaining, by the service, the cached localized resource;
   if the other localized resource is not stored in the cache:
      communicating, via the REST API, the second request from the service to the backend server for the other localized resource;
      receiving the other localized resource from the backend server in response to the second request; and
      caching the other localized resource at the service; and
   returning, to the software application, the other localized resource from the cache.

3. The method of claim 1, further comprising:
   receiving, at the service, a second request from the software application for another localized resource corresponding to the target locale;
   sending a third request from the service to the backend server for the other localized resource; and
   receiving a response from the backend server in response to the third request, the response indicating that the other localized resource is unavailable.

4. The method of claim 3, further comprising:
   returning a substitute localized resource from the service to the software application in place of the other localized resource, the substitute localized resource including an indication of the substitution.

5. The method of claim 3, further comprising:
   notifying the software application that the other localized resource is not available.

6. The method of claim 3, further comprising:
   generating, at the backend server, an external request to generate the other localized resource.

7. The method of claim 1, wherein the request is formatted as a web service request and comprises an indication of a format of the localized resource requested.

8. The method of claim 7, wherein the request comprises an indication of at least one of an internationalization library or a localization library stored on the backend server.

9. The method of claim 7, wherein the request comprises an indication of a type of format of the localized resource.

10. A non-transitory computer readable medium having instructions stored thereon that when executed by a processor cause the processor to perform a method of implementing internationalization and localization for a plurality of software applications executing independent of each other in one or more host computers, the method comprising:
receiving, at a service that is executing independent of any software and framework associated with any of the plurality of software applications from which any request is received and that is executing in a host computer, a request from a software application of the plurality of software applications for a localized resource corresponding to a target locale, the service including a representational state transfer (REST) application programming interface (API) configured for communicating requests for localized resources received from the plurality of software applications to a backend server;
determining, by the service based on a version identified in the request, whether the software application has been updated from a first version to a second version;
if the software application has been updated to the second version:
invalidating, by the service, a cached localized resource, wherein the cached localized resource corresponds to the first version of the software application;
forwarding, by the service via the REST API, the request from the software application for the localized resource corresponding to the target locale to the backend server;
in response to forwarding the request, receiving an updated localized resource from the backend server; and
caching, by the service, the updated localized resource at a cache maintained by the service;
if the software application has not been updated to the second version, obtaining, by the service, the cached localized resource; and
returning the localized resource or the updated localized resource from the service to the software application.

11. The non-transitory computer readable medium of claim 10, wherein the method further comprises:
receiving, at the service, a second request from the software application for another localized resource corresponding to the target locale; and
determining, by the service, whether the other localized resource is stored in the cache maintained by the service;
if the other localized resource is stored in the cache, obtaining, by the service, the cached localized resource;
if the other localized resource is not stored in the cache:
communicating, via the REST API, the second request from the service to the backend server for the other localized resource;
receiving the other localized resource from the backend server in response to the second request; and
caching the other localized resource at the service; and
returning, to the software application, the other localized resource from the cache.

12. The non-transitory computer readable medium of claim 10, wherein the method further comprises:
receiving, at the service, a second request from the software application for another localized resource corresponding to the target locale;
sending a third request from the service to the backend server for the other localized resource; and
receiving a response from the backend server in response to the third request, the response indicating that the other localized resource is unavailable.

13. The non-transitory computer readable medium of claim 12, wherein the method further comprises:
returning a substitute localized resource from the service to the software application in place of the other localized resource, the substitute localized resource including an indication of the substitution.

14. The non-transitory computer readable medium of claim 12, wherein the method further comprises:
notifying the software application that the other localized resource is not available.

15. The non-transitory computer readable medium of claim 12, wherein the method further comprises:
generating, at the backend server, an external request to generate the other localized resource.

16. A computing system, comprising:
a hardware platform including a processor and memory; and
a software platform executing on the hardware platform, the software platform including a plurality of software applications executing independent of each other and a service that is executing independent of any software and framework associated with any of the plurality of software applications from which any request is received, wherein the service is executable by the processor to:
receive, at the service, a request from a software application of the plurality of software applications for a localized resource corresponding to a target locale, the service including a representational state transfer (REST) application programming interface (API) configured for communicating requests for localized resources received from the plurality of software applications to a backend server;
determine, based on a version identified in the request, whether the software application has been updated from a first version to a second version;
if the software application has been updated to the second version:
invalidate a cached localized resource, wherein the cached localized resource corresponds to the first version of the software application;
forward, via the REST API, the request from the software application for the localized resource corresponding to the target locale to the backend server;
in response to forwarding the request, receive an updated localized resource from the backend server; and
cache the updated localized resource at a cache maintained by the service;
if the software application has not been updated to the second version, obtain, by the service, the cached localized resource; and
return the localized resource or the updated localized resource from the service to the software application.

* * * * *